May 25, 1937.  B. S. AIKMAN  2,081,444
BRAKE CONTROL DEVICE
Filed Feb. 13, 1935
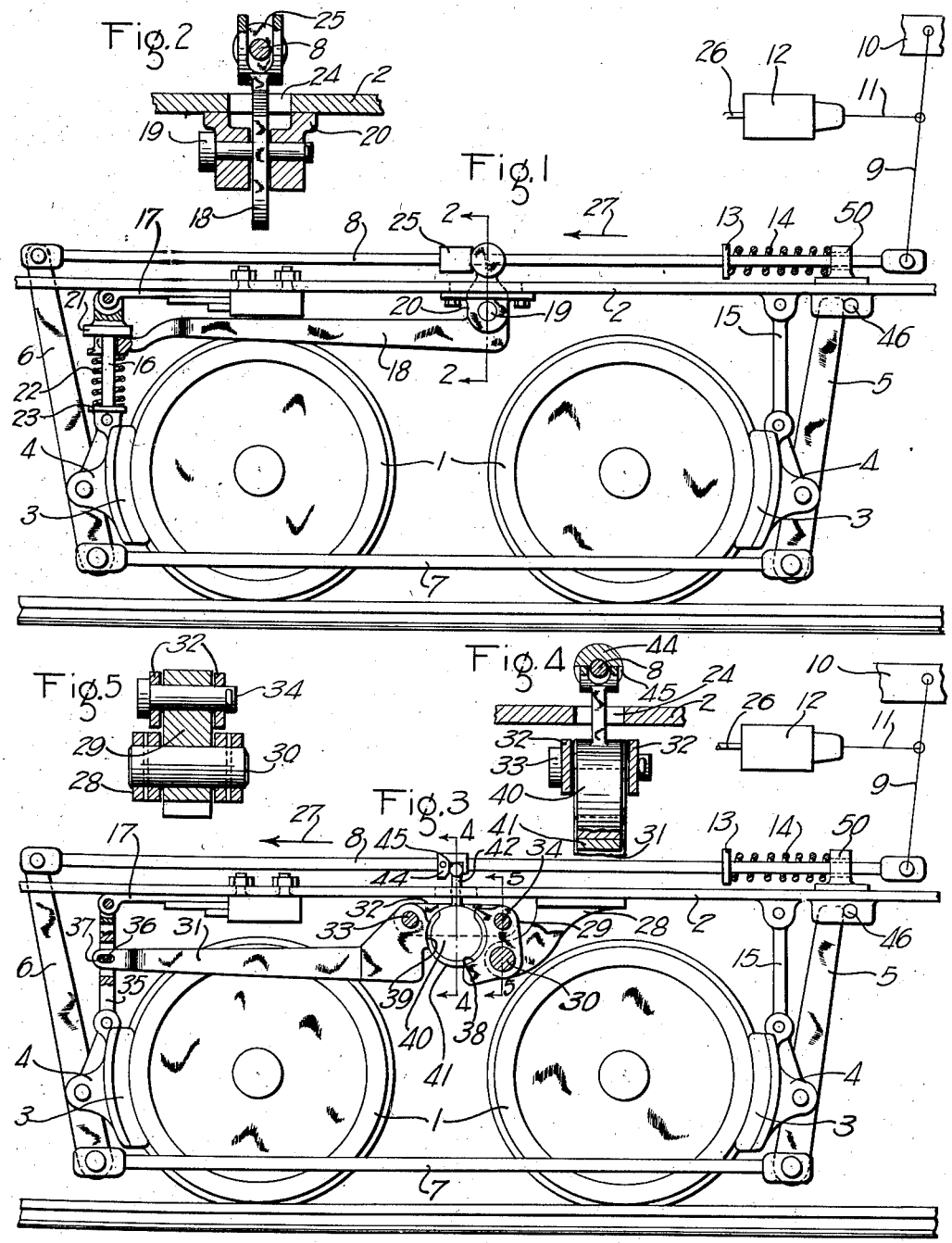
INVENTOR
BURTON S. AIKMAN.
BY Wm. M. Cady
ATTORNEY Patented May 25, 1937

2,081,444

UNITED STATES PATENT OFFICE 2,081,444

BRAKE CONTROL DEVICE

Burton S. Aikman, Wilkinsburg, Pa., assignor to The Westinghouse Air Brake Company, Wilmerding, Pa., a corporation of Pennsylvania Application February 13, 1935, Serial No. 6,332

7 Claims. (Cl. 188—181)

This invention relates to brake apparatus and more particularly to means for automatically regulating the degree of an application of brakes.

In order to stop a vehicle in the shortest distance possible it is necessary that the degree of application of brakes be limited sufficiently to avoid sliding of wheels. If the brakes on the vehicle are thus applied at some high speed, then when some lower speed is attained the degree of application is liable to become excessive and cause the wheels to slide, while in case the vehicle is running at a relatively low speed at the time the brakes are applied, the degree of application is liable to be excessive and cause sliding of wheels.

One object of the invention is to provide improved means which are automatically operative to control the degree of application of brakes on a vehicle so as to avoid sliding of wheels as above described.

Means have heretofore been proposed for accomplishing the above object, but such means, as associated with a fluid pressure brake system, have been usually arranged to release fluid under pressure from the brake cylinder and thereby reduce the degree of application. It, however, requires some time to thus release fluid under pressure from the brake cylinder and altho such release of fluid under pressure from the brake cylinder can be accomplished sufficiently fast to prevent slipping of the car wheels, it is proposed to accomplish the object in a more direct manner, namely, by providing a force which acts to directly oppose brake cylinder pressure and thereby reduce the braking effect as required, under varying conditions of speed to avoid slipping of the wheels on the vehicle.

Another object of the invention is to provide improved means adapted to automatically regulate the degree of brake application on a vehicle so as to provide a substantially constant rate of retardation of a vehicle while bringing the vehicle to a stop.

Other objects and advantages will be apparent from the following more detailed description of the invention.

In the accompanying drawing, Fig. 1 is a side elevation of a portion of a car truck having my invention associated therewith; Fig. 2 is a sectional view taken on the line 2—2 of Fig. 1; Fig. 3 is a view similar to Fig. 1 showing a modified form of my invention associated with a portion of a car truck, and Figs. 4 and 5 are sectional views taken on lines 4—4 and 5—5, respectively, of Fig. 3.

The portion of the car truck shown in Figs. 1 and 3 for the purpose of illustrating an application of the invention comprises the usual wheels 1, a portion 2 of a truck frame, brake shoes 3 adapted to have frictional engagement with said wheels, brake heads 4 carrying said brake shoes, a dead lever 5 adapted to fulcrum on a pin 46 secured to the truck frame 2 for moving the brake shoe 3 shown at the right hand side of the drawing into braking engagement with the corresponding wheel 1, a live lever 6 for moving the other brake shoe into braking engagement with the other car wheel, a connecting rod 7 connecting the lower end of the dead lever 5 to that of the live lever 6 and a pull rod 8 having one end pivotally connected to the upper end of the live lever 6. The other end of the pull rod 8 is pivotally connected to one end of a brake cylinder lever 9, the other end of which is pivotally connected to any suitable fixed portion 10 of the truck frame, while intermediate its ends the brake cylinder lever is connected to a brake cylinder push rod 11 operative by a brake cylinder 12. The pull rod 8 adjacent its connection to the brake cylinder lever 9 is slidably mounted in a bracket 50 which is secured to the truck frame 2 and interposed between one face of said bracket and a collar 13 secured to said pull rod is a brake release spring 14.

The brake shoe 3 and head 4 at the right hand end of the truck is supported by the usual hanger 15 pivotally connected at one end to said head and at the other end to the truck frame 2, while according to one feature of the invention, the brake shoe 3 and head 4 at the left hand end of the truck, shown in Fig. 1 of the drawing, is supported by a hanger 16 having one end pivotally connected to the brake shoe head 4 while the other end is pivotally connected to one end of a spring 17 which is preferably in the form of a plurality of leaves secured to the truck frame 2.

In the construction shown in Fig. 1 of the drawing, a substantially L shaped lever 18 is pivotally mounted on a pin 19 carried by a bracket 20 secured to the truck frame 2. One arm of the lever 18 extends substantially parallel to the truck frame 2 to a position beneath a collar 21 formed on the hanger 16, the end of said arm being bifurcated to receive said hanger. A spring 22 is disposed on the hanger 16 between one side of said arm and a collar 23 on the hanger for maintaining said arm in contact with the collar 21. The other arm of the lever 18 extends upwardly thru an opening 24 in the truck frame 2 into operating alignment with a member 25 secured to the pull rod 8, the end of said arm being bifurcated to straddle said pull rod and thereby engage said member each side of said pull rod.

In operation, if it is desired to effect an application of the brakes, fluid under pressure is supplied thru a pipe 26 to brake cylinder 12 in the usual manner. The brake cylinder push rod 11 is thereby operated and turns the lever 9 in a counter-clockwise direction. This acts to pull the pull rod 8 and the upper end of the live lever 6 towards the right hand thereby moving the brake shoe 3 shown at the left hand side of the drawing into frictional engagement with the left hand wheel 1 following which the connecting rod 7 and dead lever 5 are operated to move the brake shoe 3, shown at the right side of the drawing, into frictional engagement with the right hand wheel 1.

In Fig. 1 of the drawing, the brake shoes 3 are shown in the brakes applied position, just described, and it will be noted that the member 25 on the pull rod 8 is positioned substantially in engagement with the end of the vertical arm of lever 18. It will further be noted, that with the car truck moving in the direction indicated by the arrow 27, the spring 17 acts to support the brake shoe 3 in the braking position against the turning effort exerted thereon by the car wheel 1.

As the speed of the vehicle and therefore speed of rotation of the wheels 1 reduces, the coefficient of friction between the wheels 1 and shoes 3 will increase, so that for a given braking force or pressure of the brake shoes 3 against the wheels 1, the turning effort exerted on the brake shoes increases, and when this turning effort increases above the value of the leaf spring 17, said spring is deflected in a downwardly direction and through the medium of the collar 21 on the hanger 16, the lever 18 is operated to exert a force on the member 25 and thereby on the pull rod 8 in a direction opposite to the force exerted thereon by the brake cylinder 12.

The force exerted by the lever 18 on the pull rod 8 thus opposes the brake cylinder force and thereby acts to limit the braking force of the brake shoes 1 against the car wheels, and thus limit the braking effort or braking effect on the car wheels 1 to a degree which will avoid sliding of the wheels 1. If the coefficient of friction between the brake shoes and wheels continues to increase as upon a further reduction in vehicle speed, the lever 18 is thereby operated as above described to increase the force acting on the pull rod 8 in opposition to that of the brake cylinder so as to further reduce the braking force applied to the brake shoes. Thus the braking force and consequent braking effort exerted on the wheels 1 can not exceed that determined by the value of spring 17, regardless of the speed of the vehicle at the time the brakes are applied and regardless of any change in speed subsequent to an application, and it will be further noted, that since the spring 17 limits the braking effort at all times to a predetermined specific amount, the braking effort will remain substantially constant during the time a vehicle is being brought to a stop and thereby provide a substantially constant rate of retardation.

The spring 17 may be of such value as to provide any desired rate of retardation, but is preferably calculated to limit the braking effort at a degree just less than required to cause slipping of the wheels so as to provide the maximum possible rate of retardation.

When it is desired to effect a release of the brakes, fluid under pressure is released from the brake cylinder 12 thereby relieving pressure on the brake lever 9 which permits the brake release spring 14 to move the pull rod 8 towards the left hand. This movement of the pull rod 8 is transmitted through the live lever 6 to the brake shoe 3 on the left hand wheel, and from said lever through the connecting rod 7 and dead lever 5 to the brake shoe 3 on the right hand wheel and acts to move said brake shoes out of frictional engagement with said wheels in the usual well known manner.

It is well known that the brake shoes on a car become worn due to the frictional engagement with the car wheels in braking, and in a construction where no means are provided for compensating for such wear, as is the case in the construction shown in Fig. 1, such wear necessitates a greater movement of the brake cylinder push rod 11 and consequently of the pull rod 8 to bring the brake shoes 3 into frictional engagement with the car wheels than when the shoes are new.

In the construction shown in Fig. 1, wear of the brake shoes 3 will, in effecting an application of the brakes, result in the member 25 prematurely engaging the lever 18 which, acting through the collar 21 on the hanger 16 and spring 17 against the lower side of the truck frame 2, will then prevent further movement of the rod 8 and thereby limit to some low degree or, in case of severe shoe wear, possibly prevent an application of the brakes.

The construction shown in Fig. 3 of the drawing is provided to avoid the difficulty just described, and comprises a bracket 28 secured to the lower side of the truck frame 2. The lower end of bracket 28 is preferably forked and a clutch section 29 is disposed between such forks and pivotally mounted on a pin 30 extending through said forks. A lever 31 is loosely connected at one end to the clutch section 29 by means of links 32 one of which is disposed on each side of said lever and clutch section and connected thereto by pins 33 and 34, respectively. The other end of the lever 31 is connected to a hanger 35 by means of a pin 36 which extends through a slot 37 in said lever, the hanger 35 providing a link-like connection between spring 17 and the brake head 4 as does hanger 16 in the construction shown in Fig. 1.

The clutch section 29 is provided in one face with a concave jaw 38 and the lever 31 is provided with a substantially oppositely disposed concave jaw 39 in a section below the pivot pin 33, and interposed between and in peripheral engagement with said jaws is a cylindrical operating member 40, which is provided with a hardened surface 41 over the portion of the periphery adapted to be engaged by said jaws.

The cylindrical member 40 is provided with an arm 42 which extends upwardly through the opening 24 in the truck frame 2, the upper end of the arm 42 being bifurcated to straddle the pull rod 8. A member 44 is secured to the pull rod 8 and is provided on each side with a recess 45, the upper bifurcated end of the arm 42 fitting into said recesses for obtaining driving engagement with said member and thereby with the pull rod 8.

In the operation of the apparatus shown in Fig. 3, the brakes are applied and released in the same manner as hereinbefore described in connection with the apparatus shown in Fig. 1 of the drawings.

As the pull rod 8 is moved toward the right hand in applying the brakes, the arm 42 is operated by said rod to turn the cylindrical member 40 in a clockwise direction between and relative to the clutch jaws 38 and 39. Such turning movement of the cylindrical member 40 within the jaws 38 and 39 is relatively free, as long as the spring 17 is in the position shown in the drawing since only the weight of the lever 31 and links 52 act to press said jaws against said member.

When, due to a reduction in the speed of rotation of the wheels 1 or for other reasons, the braking effort exerted by the left hand brake shoe 3 on the left hand wheel 1 exceeds the predetermined restraining power of spring 17, said spring is deflected downwardly. The consequent movement of the hanger 35 actuates the lever 31 to grip the cylindrical member 40 between the clutch jaws 38 and 39 and then turn said member and the arm 42 in a counterclockwise direction so that the upper end of said arm acts against the member 44 and thereby applies a force to said member which opposes the force applied by the brake cylinder 12 to the pull rod 8, and thereby acts to prevent any further increase in the braking effort acting to slow down the wheel 1. In case the braking effort tends to further increase, a greater movement of the lever 31 results, which applies a greater force to the pull rod 8 in opposition to that applied by the brake cylinder 12, while, if for any reason, the braking effort should tend to reduce then the spring 17 actuates the hanger 35 and thereby lever 31 to effect a corresponding reduction in the pressure applied thereby to the pull rod 8.

In order to effect a release of the brakes, fluid under pressure is vented from the brake cylinder 12 which permits the release spring 14 to return the pull rod 8 and thereby the brake shoes to their release position as herein before described. When, during release, the spring 17 returns to its normal position shown in the drawing, the pressure on the clutch arm 31 is relieved which releases the clutch jaws 38 and 39 from the cylindrical member 40 after which said member turns relatively to said jaws according to the movement of the pull rod 8.

In the construction of the invention shown in Fig. 3 of the drawing, wearing of the brake shoes 3 has no effect upon accomplishing the object of the invention since the cylindrical clutch member 40 is positioned according to such wear before the clutch lever 31 is operated, so that when said lever is operated it grabs said member in its adjusted position to provide the desired operation.

It will now be evident that according to the invention improved means are provided which automatically act to limit the braking effort on a car wheel to a predetermined degree such for instance as will not cause the wheel to slide, and by virtue of this function will automatically control the deceleration of a vehicle and provide a substantially constant rate of retardation.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a vehicle wheel, means adapted to frictionally engage said wheel for braking said wheel, means resiliently supporting such braking means in braking relation with said wheel and adapted to permit movement of said braking means in one direction of rotation of said wheel upon attaining a predetermined braking effort on said wheel, a lever connected to said braking means, a rod connected to said lever, means for applying braking force to said rod and thereby through said lever and braking means to said wheel, means for applying force to said rod in opposition to the braking force applied to said rod, and lever means operative upon said movement of said braking means for operating the last mentioned force applying means.

2. In combination, a vehicle wheel, means adapted to frictionally engage said wheel for braking said wheel, means supporting said braking means in braking relation with said wheel including a spring connected to a portion of the vehicle truck, a lever connected to said braking means, a rod connected to said lever, means for applying braking force to said rod and thereby through said lever and braking means to said wheel, said spring being adapted to permit movement of said braking means in one direction of rotation of said wheel when the braking effort on said wheel exceeds the pressure of said spring, a bracket secured to the vehicle truck, a lever journaled in said bracket and having one arm movable with said braking means upon movement thereof in the direction of rotation of said wheel, said lever having another arm, and means secured to said rod and operable by the other arm of said lever whereby movement of said lever applies force to said rod in a direction to oppose braking force applied to said rod.

3. In combination, a vehicle wheel, means adapted to frictionally engage said wheel for braking said wheel, means supporting said braking means in braking relation with said wheel including a spring secured to a portion of the vehicle truck and a member connected at one end to said spring and at the other end to said braking means, said spring being adapted to permit movement of said braking means in one direction of rotation of said wheel when the braking effort of said braking means on said wheel exceeds the pressure of said spring, a lever connected to said braking means, a rod connected to said lever, means for applying braking force to said rod and thereby through said lever and braking means to said wheel, a bracket secured to said vehicle truck, a bell crank lever journaled in said bracket with one arm operatively connected to said member and with the other arm in operating relation with said rod, and means adapted to connect the last mentioned arm of said bell crank lever to said rod, upon movement of said member, to apply force to said rod in opposition to braking force applied to said rod.

4. In combination, a vehicle wheel, means adapted to frictionally engage said wheel for braking said wheel, means supporting said braking means in braking relation with said wheel including a spring secured to a portion of the vehicle truck and a member connected at one end to said spring and at the other end to said braking means, said spring being adapted to permit movement of said braking means in one direction of rotation of said wheel when the braking effort of said braking means on said wheel exceeds the pressure of said spring, a lever connected to said braking means, a rod connected to said lever, means for applying braking force to said rod and thereby through said lever and braking means to said wheel, a bracket secured to said vehicle truck, said member having a collar, a bell crank lever journaled in said bracket with one arm disposed at the braking means side of said collar and adapted to be engaged and operated thereby and with the other arm disposed in operating relation with said rod, a spring carried by said member and yieldingly maintaining the first mentioned arm of said bell crank lever in engagement with said collar, and means adapted to connect the second mentioned arm of said bell crank lever to said rod, upon movement of said member, to apply force to said rod in opposition to the braking force applied to said rod.

5. In combination, a vehicle wheel, means adapted to frictionally engage said wheel for braking said wheel, means supporting said braking means in braking relation with said wheel including a spring connected to a portion of the vehicle truck, a lever connected to said braking means, a rod connected to said lever, means for applying braking force to said rod and thereby through said lever and braking means to said wheel, said spring being adapted to permit movement of said braking means in one direction of rotation of said wheel when the braking effort on said wheel exceeds the pressure of said spring, a bracket secured to the vehicle truck, a lever journaled in said bracket and movable with said braking means upon movement thereof in the direction of rotation of said wheel, a member movable with said rod, and means associated with the last mentioned lever adapted upon movement of the last mentioned lever to lock same to said member and then apply force to said rod in opposition to the braking force applied to said rod.

6. In combination, a wheel adapted to be braked, a portion of a truck frame disposed over said wheel, a brake shoe disposed in braking relation with said wheel, a rod disposed over said wheel and operatively connected to said shoe, means for applying braking force to said rod to thereby move said shoe into engagement with and press said shoe against said wheel, a spring secured to said truck over said wheel, a support member connecting said brake shoe to said spring for supporting said shoe, said spring being adapted to permit movement of said shoe in one direction of rotation of said wheel upon obtaining a predetermined braking effort on said wheel, a bracket secured to said truck frame under said rod, a lever journaled in said bracket and having an arm operatively connected to said member whereby movement of said member moves said arm, and means operative upon movement of said arm to apply a force to said rod acting in opposition to said braking force.

7. In combination, a wheel adapted to be braked, a portion of a truck frame disposed over said wheel, a brake shoe disposed in braking relation with said wheel, a rod disposed over said wheel and operatively connected to said shoe, means for applying braking force to said rod to thereby move said shoe into engagement with and press said shoe against said wheel, a spring secured to said truck over said wheel, a support member connecting said brake shoe to said spring for supporting said shoe, said spring being adapted to permit movement of said shoe in one direction of rotation of said wheel upon obtaining a predetermined braking effort on said wheel, a bracket secured to said truck frame under said rod, a clutch device carried by said bracket and having a pair of relatively movable, spaced concave jaws, an arm associated with one of said jaws and operatively connected to said member, a cylindrical member disposed in the space between and in frictional engagement with said jaws, an arm projecting from said cylindrical member and pivotally connected to said rod, an arm carried by one of said clutch jaws and connected to said support member and operative in the normal position of said brake shoe to release said clutch jaws from locking engagement with said cylindrical member, said arm being operated by said support member upon movement of said shoe in the direction of rotation of said wheel to lock said cylindrical member between said clutch jaws and thereby operate the arm projecting from said cylindrical member to apply force to said rod in opposition to the braking force applied to said rod.

BURTON S. AIKMAN.